US006025773A

United States Patent [19]

Bresnan

[11] Patent Number: 6,025,773

[45] Date of Patent: Feb. 15, 2000

[54] TACTILE SAFETY GUIDANCE SYSTEM FOR LOW VISIBILITY SITUATIONS

[76] Inventor: William P. Bresnan, 13 Queens Ct., Lakewood, N.J. 08701

[21] Appl. No.: 09/225,088

[22] Filed: Jan. 4, 1999

Related U.S. Application Data

[60] Provisional application No. 60/074,019, Feb. 9, 1998.

[51] Int. Cl.[7] ........ H04B 3/36

[52] U.S. Cl. ........ 340/407.1; 340/331; 340/332; 340/326; 340/691.4; 116/205; 52/177

[58] Field of Search ........ 340/407.1, 331, 340/326, 644, 332, 691.4, 693.11; 116/205, DIG. 17, 201, DIG. 14; 52/177, 174

[56] References Cited

U.S. PATENT DOCUMENTS

| | | | |
|---|---|---|---|
| 3,408,025 | 10/1968 | Davis | 244/118.5 |
| 4,080,087 | 3/1978 | Phillips | 404/72 |
| 4,385,586 | 5/1983 | Schriever | 116/205 |
| 4,401,050 | 8/1983 | Britt et al. | 116/205 |
| 4,715,743 | 12/1987 | Schmanski | 404/9 |
| 4,754,266 | 6/1988 | Shand et al. | 340/691 |
| 5,309,863 | 5/1994 | Leeb, Jr. | 116/205 |
| 5,331,918 | 7/1994 | Honigsbaum | 116/205 |
| 5,626,094 | 5/1997 | Jeffrey et al. | 116/205 |
| 5,775,016 | 7/1998 | Chien | 40/544 |

*Primary Examiner*—Daniel J. Wu
*Attorney, Agent, or Firm*—Clifford G. Frayne

[57] ABSTRACT

A tactile safety guidance system for hallway and corridor systems for use in low visibility situations by an individual in a prone position, the guidance system having a plurality of first tactile directional symbols in linear spaced apart relationship positioned on the wall of a corridor proximate the floor and identifying the direction in which an individual should proceed in order to reach an emergency exit, a second tactile directional symbol positioned on the floor of an intersecting corridor indicating the direction in which the individual should proceed at the intersecting corridor in order to reach an emergency exit and a third tactile directional symbol positioned on the emergency exit proximate the floor and in vertical alignment with the opening mechanism of the emergency exit identifying to the individual the location of the emergency exit and opening mechanism.

10 Claims, 5 Drawing Sheets

FIRST TACTILE DIRECTIONAL SYMBOL
(FIRST EMBODIMENT)

BASEBOARD MOLDING STRIP

FIRST TACTILE DIRECTIONAL SYMBOL (THIRD EMBODIMENT)

FIRST TACTILE DIRECTIONAL SYMBOL (SECOND EMBODIMENT)

SECOND TACTILE DIRECTIONAL SYMBOL

SECOND TACTILE DIRECTIONAL SYMBOL

THIRD TACTILE DIRECTIONAL SYMBOL

TACTILE SAFETY GUIDANCE SYSTEM FOR LOW VISIBILITY SITUATIONS

Applicant claims the benefit of provisional application 60/074,019 filed Feb. 9, 1998.

BACKGROUND OF THE INVENTION

1. Field of the Invention

The present invention relates to safety guidance systems for buildings and structures in low or zero visibility situations such as the absence of electrical power at night or more particularly in a fire situation where the air is heavily charged with smoke from ceiling to floor.

2. Description of the Prior Art

In today's global society substantial numbers of people find themselves traveling for either business or pleasure. As such, they take on a transient status with respect to their location in office buildings for business or in hotels, motels, or in some instances cruise ships. In this transient status with good visibility, the individual can normally traverse the particular facility with no problem nor anxiety. However, in situations such as a power black out or more importantly in a fire situation, where the air is heavily laden with smoke, the individual is denied the familiarity and the visual guide posts by which he maneuvers about the building. For instance, signs are not visible, nor are doorways, emergency exits, and blind dead end passageways.

Buildings are equipped with emergency lighting fixtures and in some instances, there have been developed luminescent signs for use in low visibility or smoke situations. However, in a fire situation with heavily laden smoke, these luminescent signs may be insufficient and the emergency lighting system may fail. In such a situation, the individual is in an extremely anxious state and his or her life is in danger as oxygen is depleted from the air and the individual may not even be able to open their eyes to see due to the burning sensation of the smoke.

One axiom with respect to a fire situation in either a familiar or unfamiliar area is to get as close to the floor as possible since the heat and smoke will rise and breathable air will be found closest to the floor.

The apparatus and system disclosed herein is designed to be positioned adjacent to or on the floor in the hallways and corridors of hotels, motels, office buildings, cruise ships, hospitals, nursing homes and the like. It provides a tactile directional system for the individual and guides the individual towards the closest emergency exit and identifies that emergency exit and the location of the handle on that emergency exit. The system also identifies cross corridors which are dead ends or which should not be taken. Still further the system identifies to the individual when the individual is approaching the emergency exit door.

Due to its tactile nature, the system can be operated by the individual user with his or her eyes closed which is more often the case particularly in a smoke laden situation such as a hallway of a large building.

The system can be installed as an after market item and with respect to its positioning on the baseboard moldings or it could be incorporated as a preformed protrusion in mass produced baseboard moldings such that the color of the protrusion would match the general color of the baseboard molding.

The system is described for and has primary application for hallways in hotels, motels, office buildings, cruise ships, hospitals and nursing homes because these facilities are visited upon by transient individuals who lack familiarity with the structure. Further, the aforesaid structures normally contain hallways which are free from furniture or other obstructions. The system could certainly have application in other structures where hallways and corridors are uninterrupted by furniture or obstructions. It could even have application in the home if such hallways or corridors were present. Its drawback in the home and in particular rooms is that normally there is furniture positioned against the walls which would prevent the individual from uninterrupted contact with the system. Still further, in familiar locations such as the home, the individual has familiarity with the structure because of the type and location of the furniture.

OBJECTS OF THE INVENTION

An object of the present invention is to provide for a novel tactile guidance system for installation in the hallways of office buildings, hotels, motels, cruise ships or the like which can guide a person to the nearest emergency exit and simultaneously warn the individual of dead ends.

A still further object of the present invention is to provide for a novel tactile guidance system which will alert the individual of his or her approach to an emergency exit.

A still further object of the present invention is to provide for a novel tactile guidance system which will identify the emergency exit to the individual and identify the location of the opening mechanisms for the emergency exit.

A still further object of the present invention is to provide for a novel tactile guidance system which can be installed in existing structures.

A still further object of the present invention is to provide for a novel tactile guidance system which can be incorporated as original equipment in new construction.

Still further, an object of the present invention is to provide for a novel tactile guidance system which is aesthetically pleasing and not unattractive when installed.

SUMMARY OF THE INVENTION

A tactile guidance system for low or zero visibility situations and in particular, fire and heavily smoke charged air situations in which a plurality of first tactile directional symbols are in spaced apart relationship on the baseboard molding of the hallways, the symbols being directional indicators in fixed spaced apart relationship indicating the direction of the nearest emergency exit, the spaced apart relationship of the symbols becoming less as symbols approach the emergency exit. A second tactile directional symbol positioned on the floor and spanning an intersecting cross hallway or alcove so as to warn and direct the individual in the direction in which he or she should proceed. A third tactile directional symbol positioned on the emergency exit door proximate the baseboard, signaling the presence of the emergency exit and simultaneously identifying the side of the emergency exit upon which the opening mechanism is located.

BRIEF DESCRIPTION OF THE DRAWINGS

These and other objects of the present invention will become evident particularly when taken in light of the following illustrations, wherein.

DETAILED DESCRIPTION OF THE DRAWINGS

Figure 1:
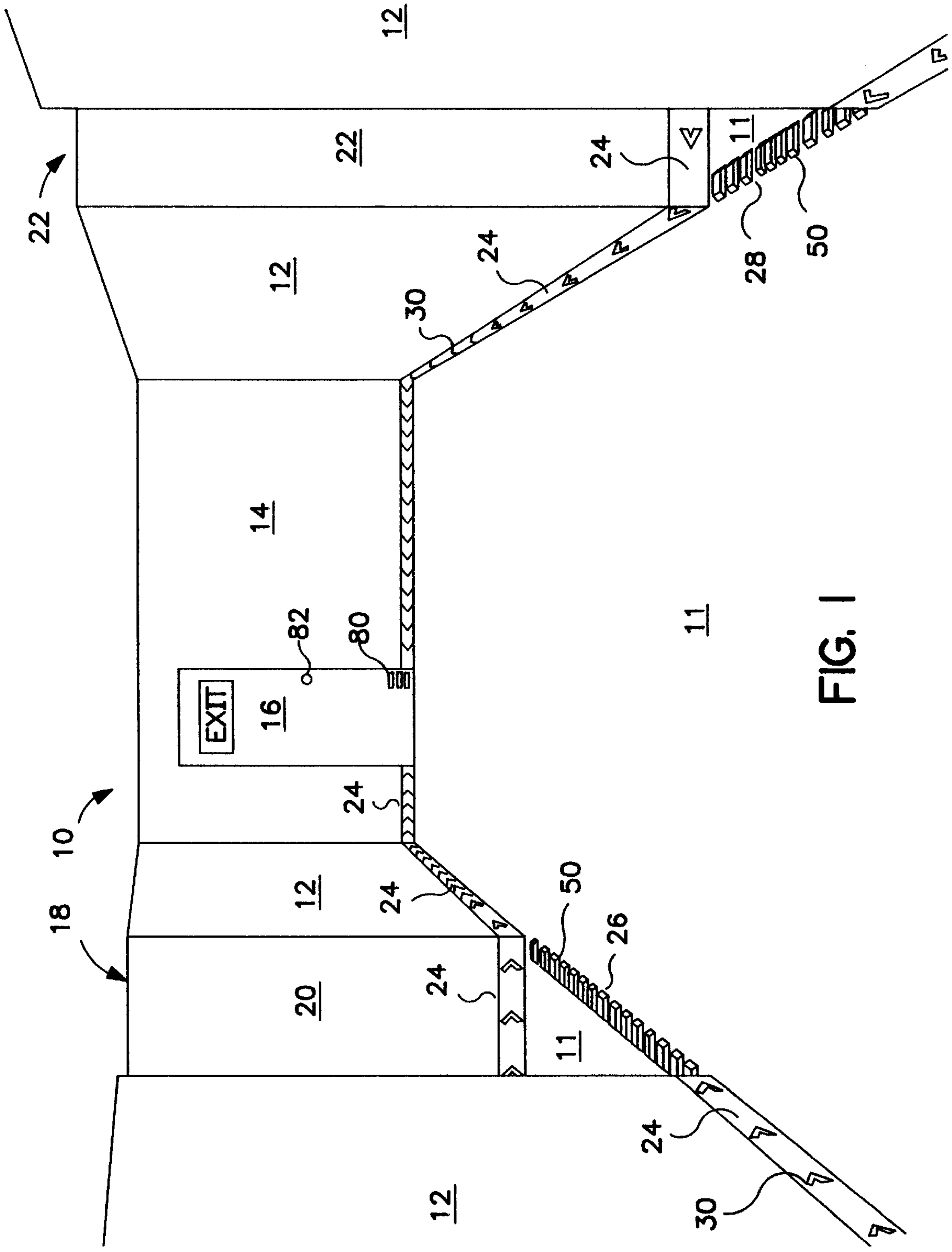
FIG. 1 is a perspective view of a hallway with a tactile guidance system installed.

In order to understand the overall concept of the tactile guidance system, FIG. 1 is a perspective view of a typical hallway or corridor 10 which might be found in an office building, hotel, motel, cruise ship or the like. Hallway 10 is defined by floor 11, side walls 12 and end wall 14 in which there is located an emergency exit door 16.

It is not uncommon in structures of the type previously identified where there would be cross corridors 18 defined by their own side walls 20 or alcoves or dead end corridors 22 defined by their side walls 22, and floor 11.

The object of the tactile guidance system is to guide individuals from the various hallways, corridors, cross corridors and dead end corridors or alcoves to the nearest emergency exit 16. This is accomplished with a tactile guidance system formed on or positioned on the baseboard molding 24, the intersection 26 of cross corridors with the main corridor and the intersection 28 of dead end corridors or alcoves with the main corridor 10 or cross corridors 18.

A plurality of tactile directional symbols 30 are positioned on or formed in the baseboard molding 24 and in the instant illustration, the tactile directional symbols are in the form of arrow heads which are raised out or protrude from baseboard molding 24 as more fully described hereafter. The tactile directional symbols 30 line the baseboard molding 24 on both sides of the main corridor 10, cross corridor 18 or alcove or dead end corridor 22 and point in the direction of the closest escape route such that when the corridors are filled with smoke, an individual crouching or crawling on hands and knees low to the floor in order to avoid the heaviest smoke and seek any remaining fresh air can be guided by dragging his hand along the baseboard molding following the direction of the tactile guidance symbols. As discussed hereafter, the tactile guidance symbols 30 are spaced a uniform distance apart, but it can be seen from FIG. 1 that as one approaches the emergency exit 16 in end wall 14, the tactile directional symbols 30 are positioned closer together to alert the individual that they are approaching the emergency exit door 16.

An individual under such low visibility conditions must be warned or directed as to which direction to take when traveling down a main corridor 10 and encountering a cross corridor 18 or when traveling down a cross corridor 18 or dead end corridor or alcove 22 and encountering main corridor 10. In such situations, a second tactile directional symbol 50 is positioned on the floor at the intersection point 26 or 28. This second tactile directional symbol is a washboard like repetitive surface of sufficient height to be recognized by the individual's hand, but not of sufficient height to present a tripping problem to an individual walking in a normal upright position.

As an example as to the operative characteristics of this second tactile directional symbol 50, presume that in a smoke situation, an individual is traveling down the left side of main corridor 10 utilizing the first tactile directional symbols 30. Upon encountering the corner at cross corridor 18, the individual would feel the floor and encounter second tactile directional symbol 50 which would alert the individual that he was to continue straight ahead and that he was crossing a cross corridor 18. Upon reaching the other side of the cross corridor 18, the individual would then engage again with first tactile directional symbols 30 and proceed to end wall 14 and emergency exit 16.

Consider the situation where an individual is traveling in cross corridor 18 along the left side towards main corridor 10. The individual would be engaging the first tactile directional symbols on the baseboard molding 24 of wall 20 until the intersection point with main corridor 10 was reached. The individual would then feel the floor and tactally engage second tactile directional symbol 50. This would alert the individual of the intersection and that the individual would place his hand about the corner to determine whether he should make a left turn or cross the corridor. The individual would engage the first tactile directional symbol on side wall 12 and know that he was to continue along that wall towards emergency exit 16. If the individual were exiting cross corridor 18 by following the first tactile directional symbols on the right hand wall (not shown), the engagement with second tactile directional signals 50 on the floor would indicate that he should reach around the corner onto wall 12 to determine the directional orientation of the first tactile directional symbol 30 on wall 12. This would indicate that the individual should cross corridor 18 and reengage the first tactile directional symbols on wall 12 of main corridor 10. The same procedure would be followed by an individual exiting dead end corridor or alcove 22 onto main corridor 10.

As a final piece of the guidance system, a third tactile directional symbol 80 would be affixed to the emergency exit 16. This third tactile directional symbol 80 would be positioned on the side of the emergency exit 16 to indicate on which side the opening device 82 for the emergency exit was located. Thus an individual encountering the third tactile directional symbol 80 would know on which side of the emergency exit 16 to locate the opening mechanism 82.

Figure 2:
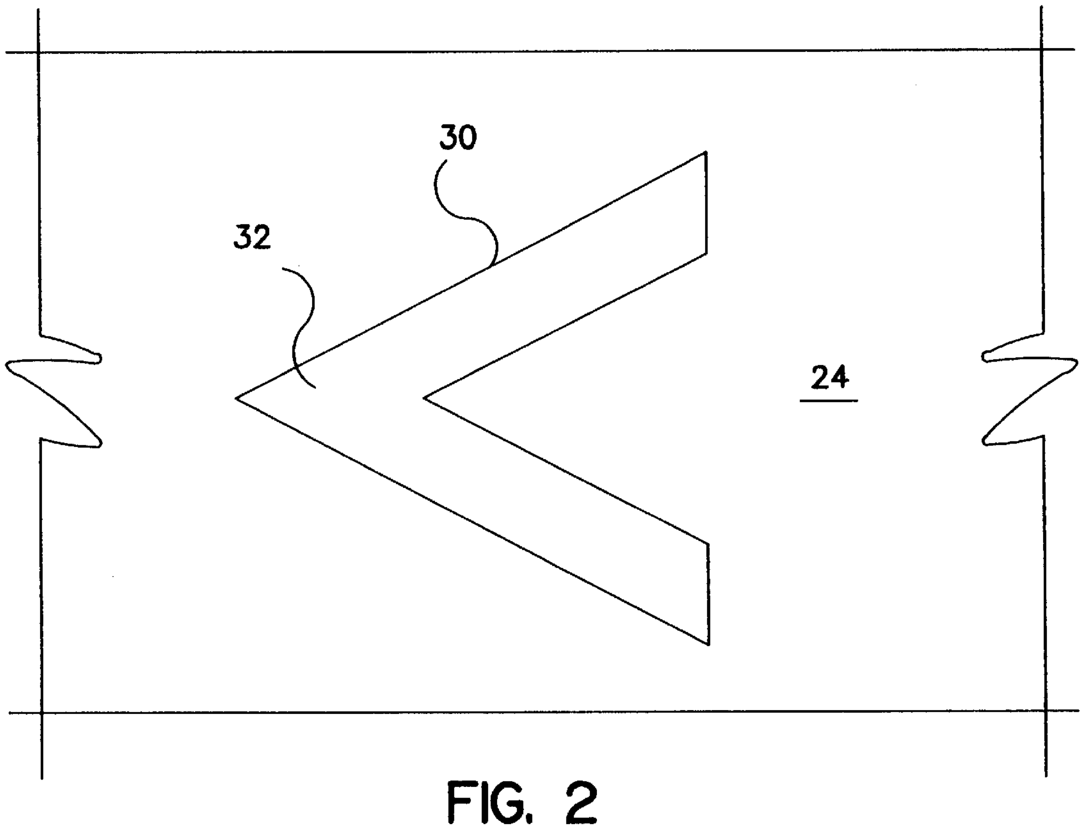
FIG. 2 is a planar view of a first tactile directional symbol.
Figure 3:
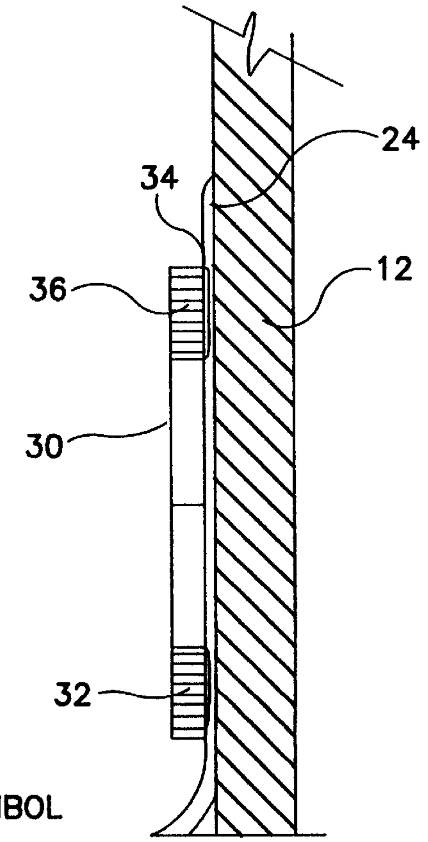
FIG. 3 is a side elevational view of a first tactile directional symbol.

Referring now to FIG. 2 there is illustrated a first embodiment of the first tactile directional symbol 30. FIG. 3 is a side elevational view of the first embodiment of first tactile directional symbol 30. In its simplest form, first tactile directional symbol 30 is arrow-shaped resembling the letter V on its side. It has a planar front surface 32, a planar rear surface 34 and a thickness 36 of sufficient dimension to be tactally recognized in situations of low visibility such as a smoky corridor.

Typically, mass produced baseboard molding 24 are normally of a height of four inches. Preferably a first tactile directional symbol 30 would be of sufficient dimension such that when positioned on or formed in baseboard molding 24 it would be easily recognizable.

FIG. 3 illustrates the positioning of first tactile directional symbol 30 on baseboard molding 24 by means of an adhesive 38 which would be the preferred mode of positioning the first tactile member 30, although any suitable fastening means is acceptable. Further, first tactile directional symbol 30 would be manufactured from any suitable thermoplastic material which would have some resistance to degradation from extreme heat. Still further, with respect to after market installations, the first tactile directional symbol 30 would be transparent so as to permit the underlying color of the baseboard molding 24 to be visible and thus aesthetically pleasing. As will be discussed hereafter, when the first tactile directional symbol 30 is formed in the baseboard molding during the manufacturing process for the baseboard molding, it would naturally have the selected color of the baseboard molding 24.

Figure 5:
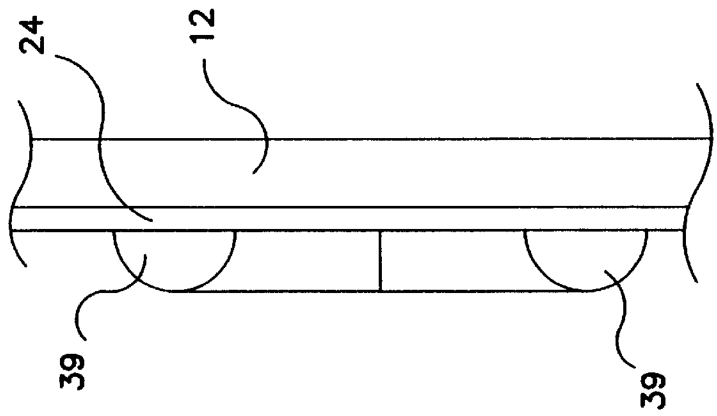
FIG. 5 is a side elevational view of a third embodiment of a first tactile directional symbol.
Figure 4:
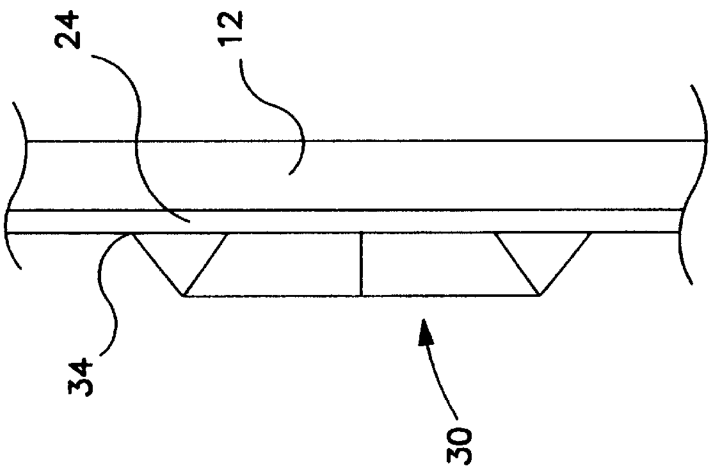
FIG. 4 is a side elevational view of a second embodiment of a first tactile directional symbol.

While the basic embodiment the first tactile directional symbol 30 is illustrated with a both planar upper and lower backing surfaces, it will be recognized by those skilled in the art that a beveled cross section 37 as illustrated in FIG. 4 or an arcuate cross section 39 as illustrated in FIG. 5 would perform similar functions.

Figure 6:
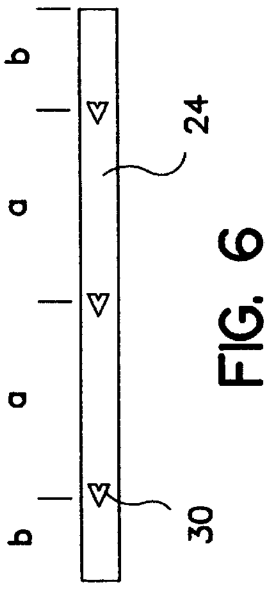
FIG. 6 is a side planar view of a baseboard molding strip.

FIG. 6 illustrates a typical baseboard molding section length of 48 inches which is the normal length in which baseboard is manufactured and sold. First tactile directional symbol 30 could easily be formed in a manufacturing process of baseboard molding 24 by a stamping process. In such a situation, the first tactile directional symbols 30 would be formed on each length of baseboard 24 at 16 inch intervals a leaving 8 inch intervals b between the outer tactile directional symbols and the end of the strip of baseboard molding 24 such that when successive strips were positioned on the walls 12, 20 and 22, the first tactile directional symbols would be at 16 inch intervals. Separate strips with the first tactile directional symbols 30 and more frequent intervals such as 8 inches, would be utilized on the walls proximate the emergency exit as an alert to the individual of the approach of the emergency exit door.

Figure 7:
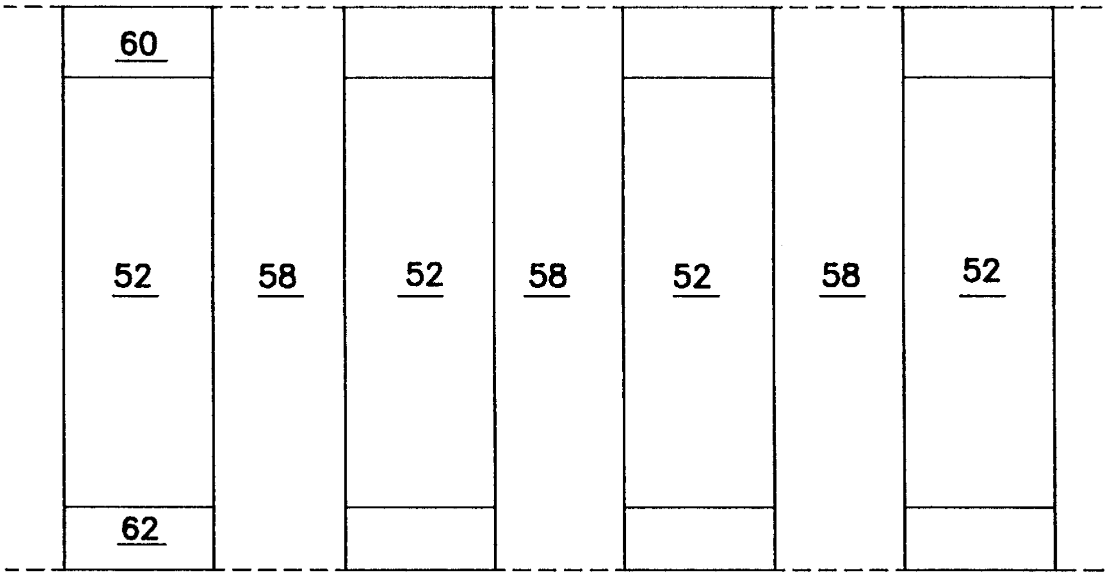
FIG. 7 is a top planar view of a second directional symbol and embodiments thereof.
Figure 8:
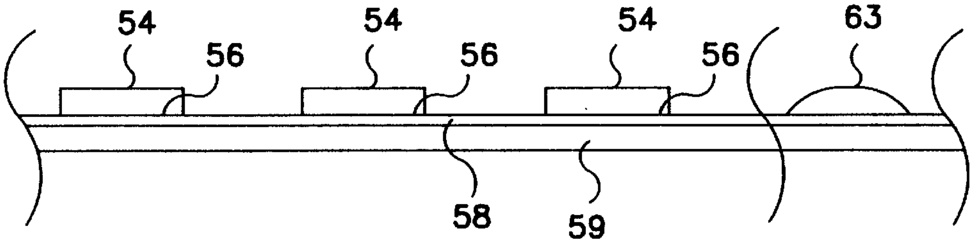
FIG. 8 is a side elevational view of the second tactile directional symbol and embodiments thereof.

FIG. 7 is a top planar view of the second tactile directional symbol 50 and FIG. 8 is a side view of FIG. 6 as well as several embodiments thereof. This second symbol would consist of a plurality of spaced apart tactile members 52, generally rectangular in nature having an upper surface 54 and a lower surface 56. These members 52 could be individually positioned on the floor at the intersection of a cross corridor and main corridor or dead end corridor alcove and main corridor by means of an adhesive or alternatively they could be formed on a backing strip of 58 which could be cut to the width of the cross corridor or dead end corridor or alcove and then secured to the floor by means of an adhesive 59 on the backing strip. Members 52 would be of such a height so as not to present a tripping obstacle, but be easily recognizable by a touch of the hand. As such, members 52 in order to further reduce the tripping possibility may have beveled ends 60 and 62. It will be recognized that while members 52 have been illustrated with a substantially rectangular cross section, that they may also be formed with an arcuate cross section 63 and rounded ends to prevent a tripping hazard or another geometric shape.

Figure 10:
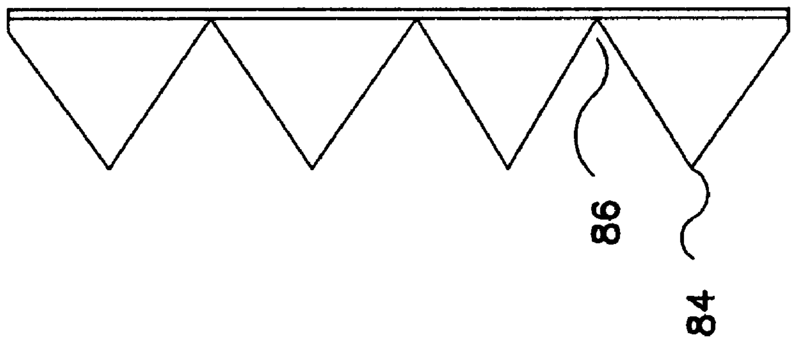
FIG. 10 is a side elevational view of third tactile directional symbol.
Figure 9:
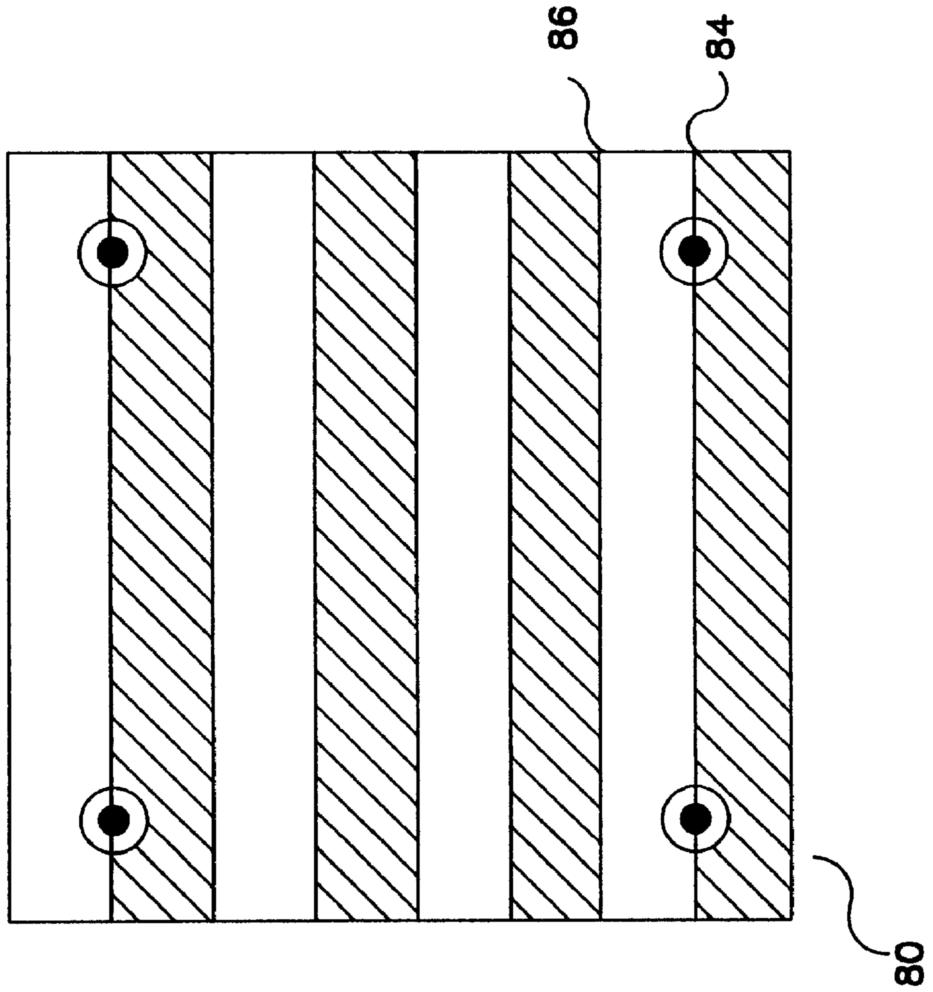
FIG. 9 is a front planar view of a third tactile directional symbol.

Considering FIG. 9, there is disclosed a front planar view of the third tactile directional signal 80 and FIG. 10 is an end elevational view of third tactile directional signal 80. Third tactile directional signal 80 identifies the emergency exit 16 to the individual and simultaneously identifies to the individual the location or side of the door in which the opening device 82 is positioned. The individual will be alerted to his or her approach to the emergency exit 16 by the greater frequency of the first tactile directional symbols 30. As illustrated in FIG. 1, if the individual were approaching emergency exit 16 from the right hand side, the individual would immediately engage third tactile directional symbol 80 and be alerted that the opening device 82 was directly above which in most doors would be approximately 30 inches. If an individual were approaching emergency exit 16 from the left as illustrated in FIG. 1, the first tactile directional symbols 30 would end with emergency exit door 16 and the individual would continue in tactile contact with the door until the individual engaged the third tactile directional symbol 80. It should be pointed out that in traveling down the main corridor 10, cross corridor 18, or dead end corridor or alcove 22, if the individual encounters a door with no third tactile directional symbol 80 positioned thereon, the individual will continue on past that door recognizing it as a door which was not an emergency exit.

As illustrated in FIGS. 9 and 10, the preferred embodiment of third tactile directional symbol 80 is one of a washboard pattern having alternating crests 84 and valleys 86. In the embodiment illustrated, the crests are a plurality of triangle shapes and the valleys are inverted triangular depressions oriented in a horizontal format and may also consist of protrusions and depressions which are rectangular in cross section or another geometric cross sectional shape. Third tactile directional symbol 80 may be secured to the door by adhesive or other suitable fastener.

The system has heretofore been described with respect to add on features with respect to the first, second and third tactile directional symbols. As an add on feature, the first tactile directional symbol 30 may be made of a transparent thermoplastic material which would not denigrate under heat, and being transparent, it could be added as an aftermarket item on already in place baseboard material having a particular color and thereby not detract from the color and aesthetics of the baseboard. Similarly, the first tactile directional symbol 30 could also be preformed or embossed in the baseboard material during the manufacturing process and thus present the necessary protrusion to the individual while being of one piece construction and of color identical to the baseboard color. Still further, second tactile directional symbol 50 could be positioned as a strip across the cross corridors, dead end corridors and alcoves such that its upper surface was in alignment with the carpeting of such corridors. In such instance, it would not present a tripping hazard, but would still present its tactile surface in situations as described herein. Second tactile directional symbol 50 could also be incorporated in a strip of carpet at the aforementioned location and thereby further contribute to the aesthetic appearance of the hallway while still providing the lifesaving and guidance features of the system.

While the present invention has been described with respect to particular shapes and tactile features of the three tactile directional symbols, it will be recognized that the shapes may be varied as long as they are capable of providing tactile direction and are consistent throughout the structure.

While the present invention has been described with respect to the preferred embodiment thereof, it will be recognized by those of ordinary skill in the art that many modifications and adaptations can be made without departing from the spirit and scope of the invention and therefore it is manifestly intended that the scope of the application be limited only by the claims thereof.

I claim:

1. A tactile safety guidance system for corridor systems for use in low visibility situations by an individual in a prone position to reach an emergency exit, said tactile guidance system comprising:

a plurality of first tactile directional symbols in linear spaced-apart relationship positioned on a wall of a corridor of said corridor system proximate a floor of said corridor of said corridor system, said first tactile directional symbols to tactically identify a direction which an individual should proceed to reach said emergency exit;

a second tactile directional symbol positioned on said floor of said corridor of said corridor system, spanning an intersecting corridor of said corridor system, said second tactical directional symbol cooperating with said first tactile directional symbols to tactically identify a direction which said individual should proceed at said intersecting corridor to reach said emergency exit; and a third tactile directional symbol positioned on said emergency exit proximate said floor of said corridor of said corridor system in vertical alignment with an opening mechanism of said emergency exit, said third tactile directional symbol cooperating with said first tactile directional symbols to tactically identify to said individual approachment to said emergency exit and a location of said opening mechanism of said emergency exit.

2. The tactile safety guidance system in accordance with claim 1 wherein said first tactile directional symbols linear spaced apart relationship decreases proximate said emergency exit door.

3. The tactile safety guidance system in accordance with claim 1 wherein said first tactile directional symbols are transparent and positioned on the baseboard molding of said wall.

4. The tactile safety guidance system in accordance with claim 3 wherein said first tactile directional symbols are arrow shaped.

5. The tactile safety guidance system in accordance with claim 1 wherein said first tactile directional symbols are preformed on said baseboard molding.

6. The tactile safety guidance system in accordance with claim 1 wherein said second tactile directional symbol comprises a plurality of spaced apart protrusions positioned on said floor between the parallel walls of said intersecting corridor.

7. The tactile safety guidance system in accordance with claim 6 wherein said protrusions are formed on a mat secured to said floor.

8. The tactile safety guidance system in accordance with claim 6 wherein said protrusions are beveled.

9. The tactile safety guidance system in accordance with claim 1 wherein said third tactile directional symbol comprises an irregular surface distinct from the surface of said emergency exit.

10. The tactile safety guidance system in accordance with claim 9 wherein said third tactile directional symbol comprises a pad having a washboard-like surface of alternating crests and valleys.

* * * * *